(12) United States Patent
Medina

(10) Patent No.: US 7,318,493 B2
(45) Date of Patent: Jan. 15, 2008

(54) HYBRID REMOTE CONTROL LAWN MOWER

(76) Inventor: Luis Marcial Medina, 3153 Prides Crossing, Tarpon Spring, FL (US) 34688

( * ) Notice: Subject to any disclaimer, the term of this patent is extended or adjusted under 35 U.S.C. 154(b) by 0 days.

(21) Appl. No.: 10/912,324

(22) Filed: Aug. 5, 2004

(65) Prior Publication Data
US 2005/0029025 A1    Feb. 10, 2005

(51) Int. Cl.
*B60T 7/16* (2006.01)

(52) U.S. Cl. .................. 180/167; 180/65.2; 56/10.2 A; 56/10.2 R

(58) Field of Classification Search ................. 180/167, 180/168, 169, 6.48; 56/10.2 R, 10.2 A, 10.5, 56/10.8, DIG. 15; 701/22, 23, 82
See application file for complete search history.

(56) References Cited

U.S. PATENT DOCUMENTS

| | | | | |
|---|---|---|---|---|
| 2,698,507 A | * | 1/1955 | Siebring | 56/10.5 |
| 2,941,346 A | * | 6/1960 | Perry | 56/10.5 |
| 3,849,931 A | * | 11/1974 | Gulley, Jr. | 446/175 |
| 4,301,881 A | * | 11/1981 | Griffin | 180/6.48 |
| 4,318,266 A | * | 3/1982 | Taube | 180/167 |
| 4,919,224 A | * | 4/1990 | Shyu et al. | 180/168 |
| 4,947,324 A | * | 8/1990 | Kamimura et al. | 180/169 |
| 4,964,265 A | * | 10/1990 | Young | 56/10.8 |
| 5,461,292 A | * | 10/1995 | Zondlo | 180/169 |
| 5,572,856 A | * | 11/1996 | Ku | 56/10.2 A |
| 5,974,347 A | * | 10/1999 | Nelson | 180/168 |
| 6,454,036 B1 | * | 9/2002 | Airey et al. | 180/167 |
| 6,493,613 B2 | * | 12/2002 | Peless et al. | 56/10.2 A |
| 6,591,593 B1 | * | 7/2003 | Brandon et al. | 56/10.6 |
| 6,604,348 B2 | * | 8/2003 | Hunt | 56/10.6 |
| 2003/0023356 A1 | * | 1/2003 | Keable | 701/23 |
| 2004/0133316 A1 | * | 7/2004 | Dean | 701/23 |

* cited by examiner

*Primary Examiner*—Hau Phan

(57) ABSTRACT

A remote control lawn mower has two electric DC motors with gear boxes for forward/reverse/turning speed control, a gyro for fast straight line cuts, a brain comprising of microprocessors, a gas engine (typical rating being about 4.5 to 7.5 HP) to cut the grass, and an alternator to generate electricity. All heavy components such as batteries, gas engine should be engineered for optimum balanced in all its proportions. The battery power allows the unit to drive to a designated area then as soon as the engine starts the system generates its own electricity becoming a hybrid. The gas engine provides the mechanical energy for the alternator, and the alternator generates electricity. It is a fast, safe, energy efficient, effortless remote control lawn mower that does not compromise speed or power to cut the lawn.

7 Claims, 9 Drawing Sheets

HYBRID REMOTE CONTROL LAWN MOWER

The invention relates to remote control lawn mowers using a hand held transmitter and a remote control lawn mower unit.

The present invention is intended to minimize the physical labor effort in cutting the lawn by eliminating the need to follow behind the mower. This would be helpful to elderly people who maintain their lawns or to those with disabilities where physical exertion is not recommended.

SUMMARY OF THE INVENTION

The present invention has two electric DC motors with gear boxes for forward/reverse/turning speed control, a gyro for fast straight line cuts, a brain comprising of microprocessors, a gas engine (typical rating being about 4.5 to 7.5 HP) to cut the grass, and an alternator to generate electricity. All heavy components such as batteries, gas engine should be engineered for optimum balanced in all its proportions. The battery power allows the unit to drive to a designated area then as soon as the engine starts the system generates its own electricity becoming a hybrid. The gas engine provides the mechanical energy for the alternator, and the alternator generates electricity. It is a fast, safe, energy efficient, effortless remote control lawn mover that does not compromise speed or power to cut the lawn. All these unique features make the present invention a lawn mover that one controls and enjoys.

DETAILED DESCRIPTION OF THE DRAWINGS

Figure 1:
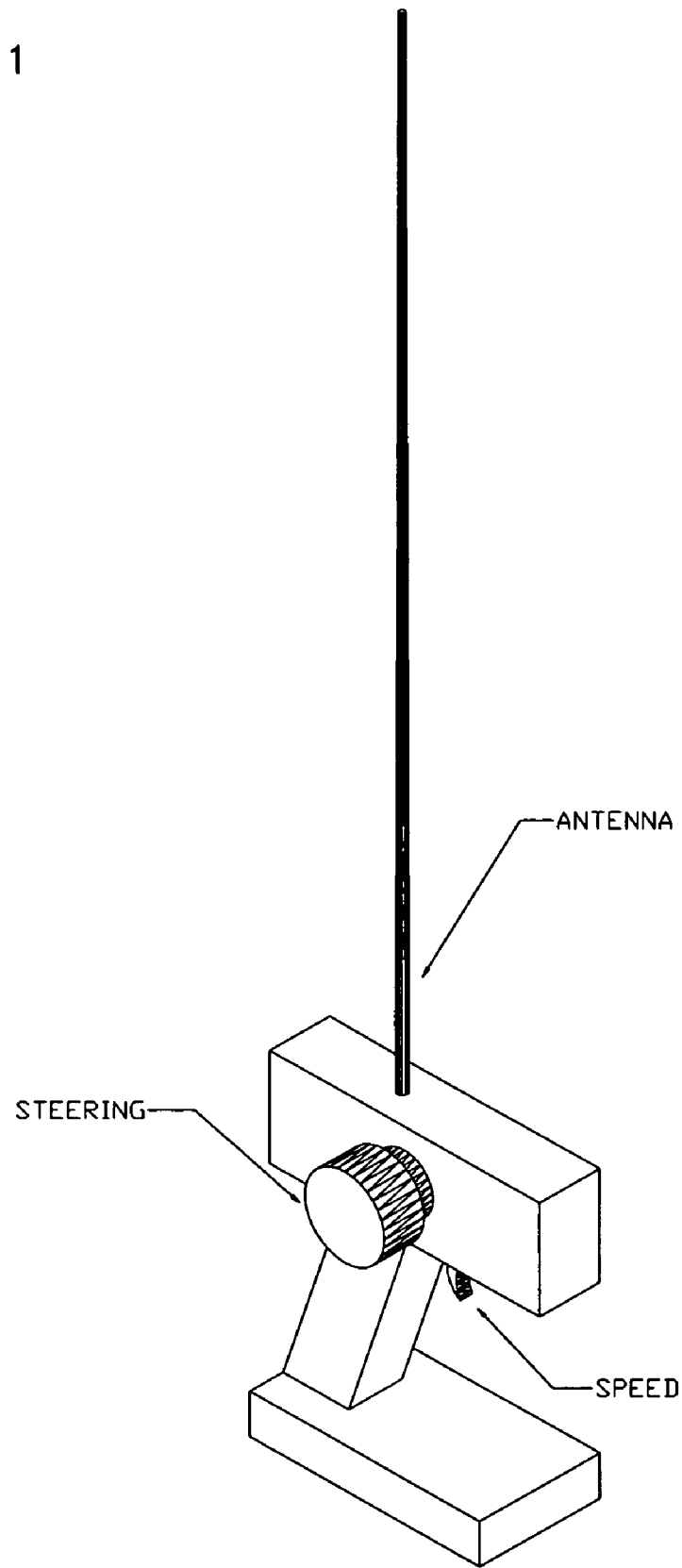
FIG. 1 is a drawing depicting a 3-D model of the hand held transmitter portion of the invention.

Referring now to the drawings, the drawings disclose a typical application or example of the present invention.

FIG. 1 is a representation of the Radio Frequency (RF) transmitter. It comprises a hand held AM transmitter (typically 2-channel), which sends two radio signals for steering and speed control. A third channel can be used for a wireless starter. The receiver is mounted on the mower portion of the present invention, which receives the radio frequency signals and convert them into 1.0 mSec to 2.0 mSec pulses. The width of the pulse is proportional to the position of the steering and speed transmitter knobs. When the steering or speed knobs are released, the internal spring would force it to go to a center position sending a 1.5 mSec pulse.

Figure 2:
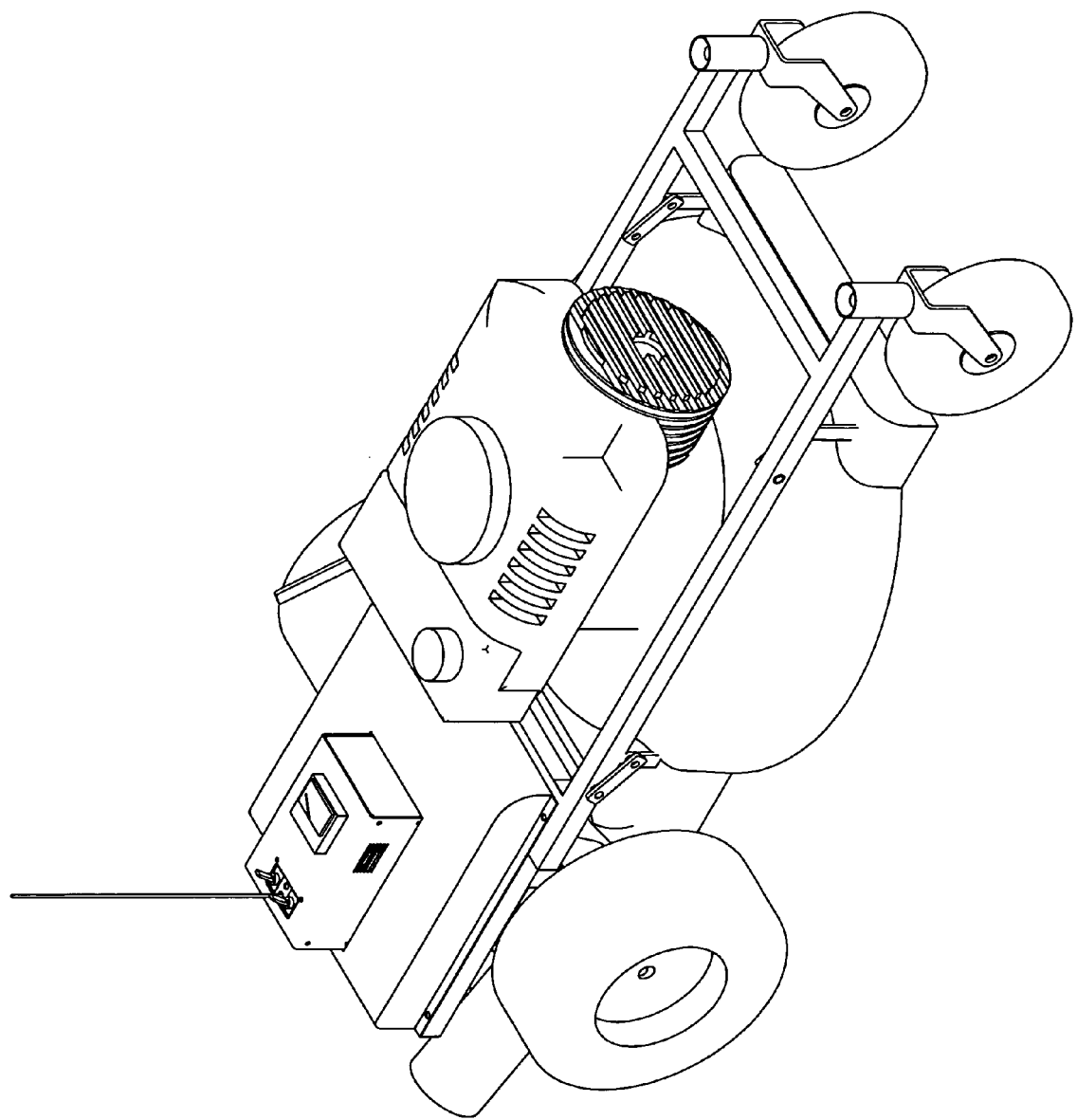
FIG. 2 is a representational 3-D Model depicting the typical mechanical and electrical components of the present invention using a perspective view of the present invention.

FIG. 2 is a representational 3-D Model depicting the typical mechanical and electrical components of the present invention. On the mower portion of the present invention, one would find the RF receiver inside the brain, the controller box designed with novel characteristics, voltage regulator, rechargeable 12-Volt Battery, two DC motors, an alternator to generate electricity, and a power lawn mover engine with blade Operation The RF Portion:

The RF Transmitter sends two RF signals which are proportional to the position of the steering and speed control knobs. The RF receiver picks up the signals and converts the RF signal into electrical pulses. Table-1 illustrates the electrical pulses.

TABLE-1

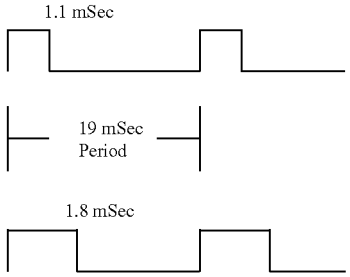

The Controller Box Portion:

The electrical pulses are connected to a micro controller (e.g., PIC16C57 shown on FIG. 3) which converts the electrical pulses into two 8-bit byte binary values one for the steering control and speed control.

Figure 3:
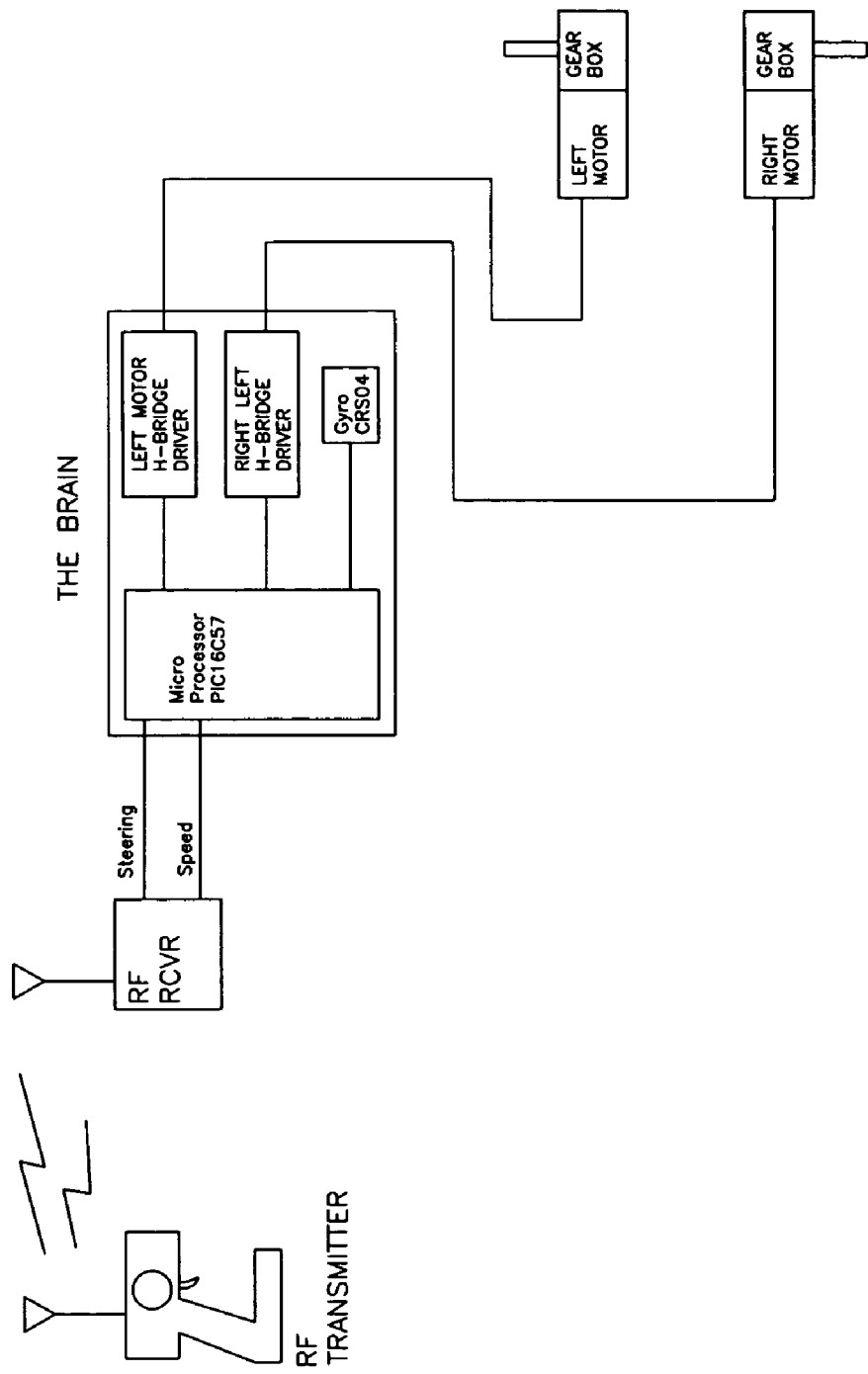
FIG. 3 illustrates the functional components of the controller box portion.

FIG. 3 illustrates a schematic representation of an example of its functional components. In the depiction, the microcontroller receives the electrical pulses from the receiver and converts them into 8-bit binary values 0 to 100 in decimal. The zero value refers to a 1 mSec pulse and the 100 value to 2 mSec. The microprocessor uses these values to calculate the correct speed and direction. The microprocessor converts the binary values into a 10 KHz PWM (pulse width modulation) and controls two H-Bridge power MOSFET driver. A decimal value of 50 corresponds to a zero PWM (a low signal), a value of 75 corresponds to a 50% PWM, a value of 100 corresponds to 100% PWM (high signal), a value of 25 corresponds to a 50% PWM going on reverse, and a zero value corresponds to a 100% PWM going on reverse.

The microcontroller has connections to a gyro where its function is to maintain a straight course whenever the steering command sends a 1.5 mSec pulse and the speed command is greater than 0 mile/hr. whenever these conditions are met, the microcontroller would remember the initial direction. If the unit deviates from its course due to terrain, the gyro would measure the deviation and the microcontroller would try to correct its course.

The invention has two independent motors on the rear. The unit turns to the right when there is more current flowing through the motor on the left. The mower turns to the left when there is more current flowing through the motor on the right. This configuration delivers zero turning radius and better terrain adaptation.

Figure 4:
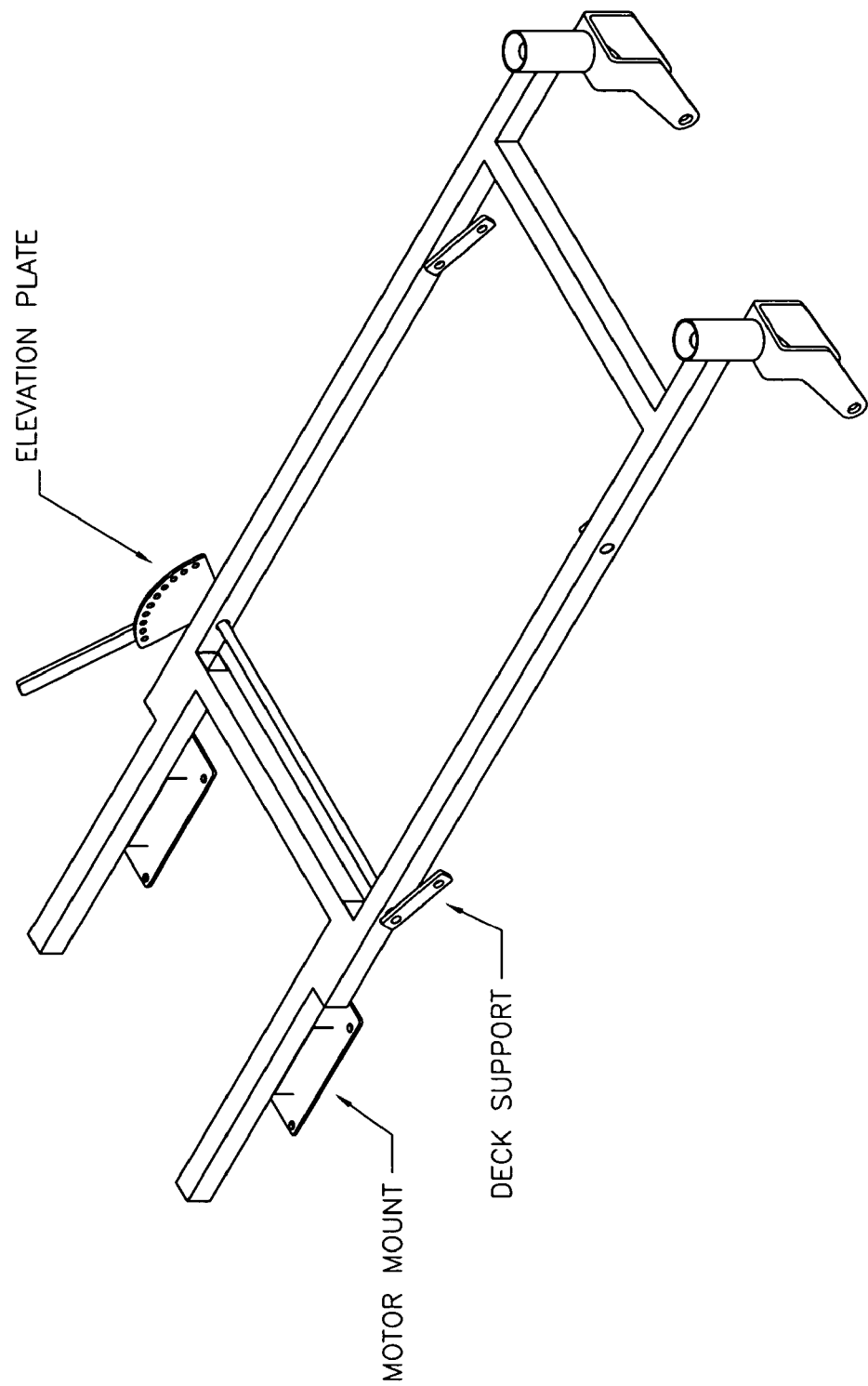
FIG. 4 illustrates the frame of the unit with elevation plate and battery holder.

FIG. 4 illustrates the frame of the hybrid remote control lawn mower which accommodates the alternator with the gas engine. The elevation plate raises the gas engine with the alternator.

Figure 5:
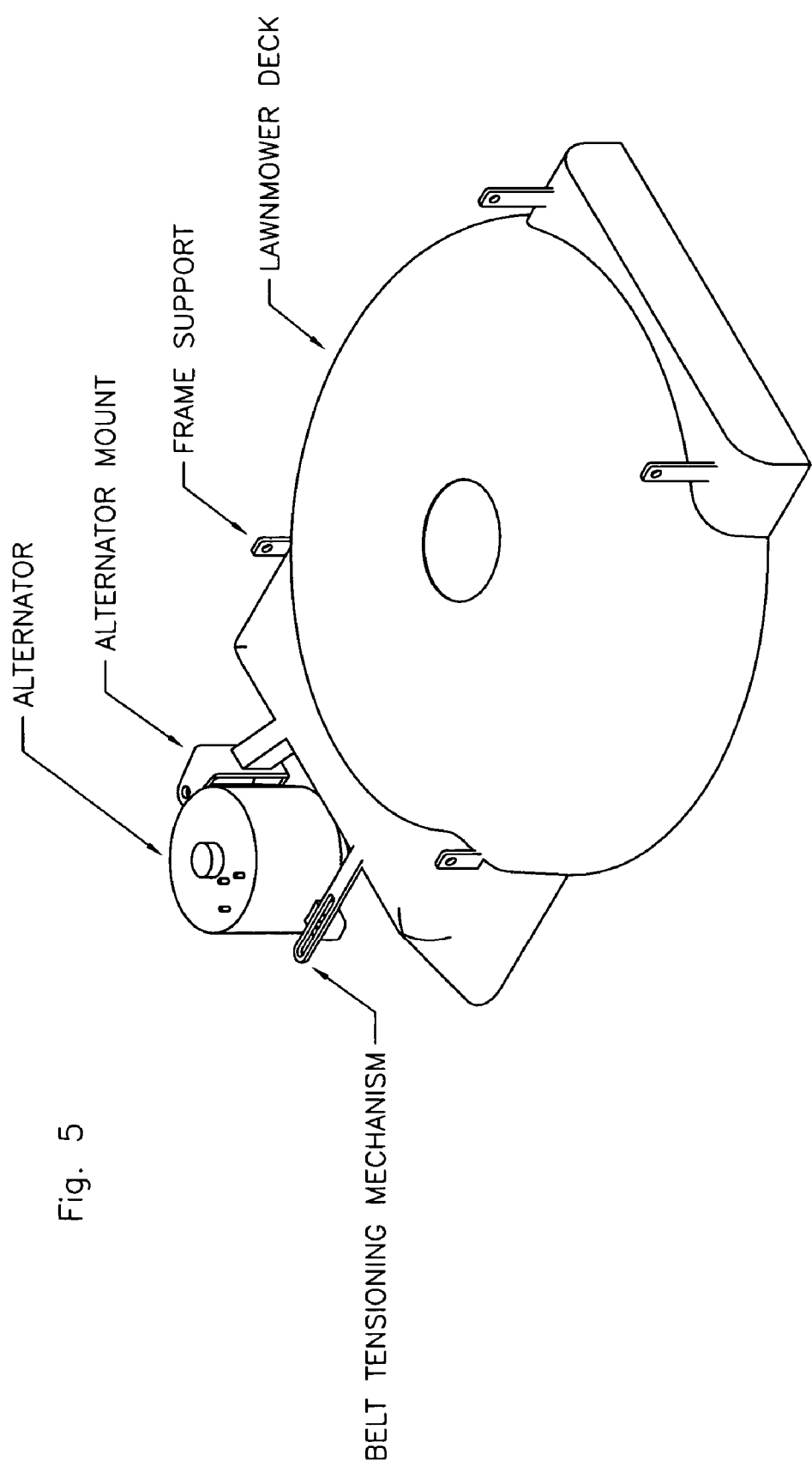
FIG. 5 illustrates the alternator mount on a lawn mower deck.

FIG. 5 illustrates the attachment of the alternator to the lawn mower deck.

Figure 6:
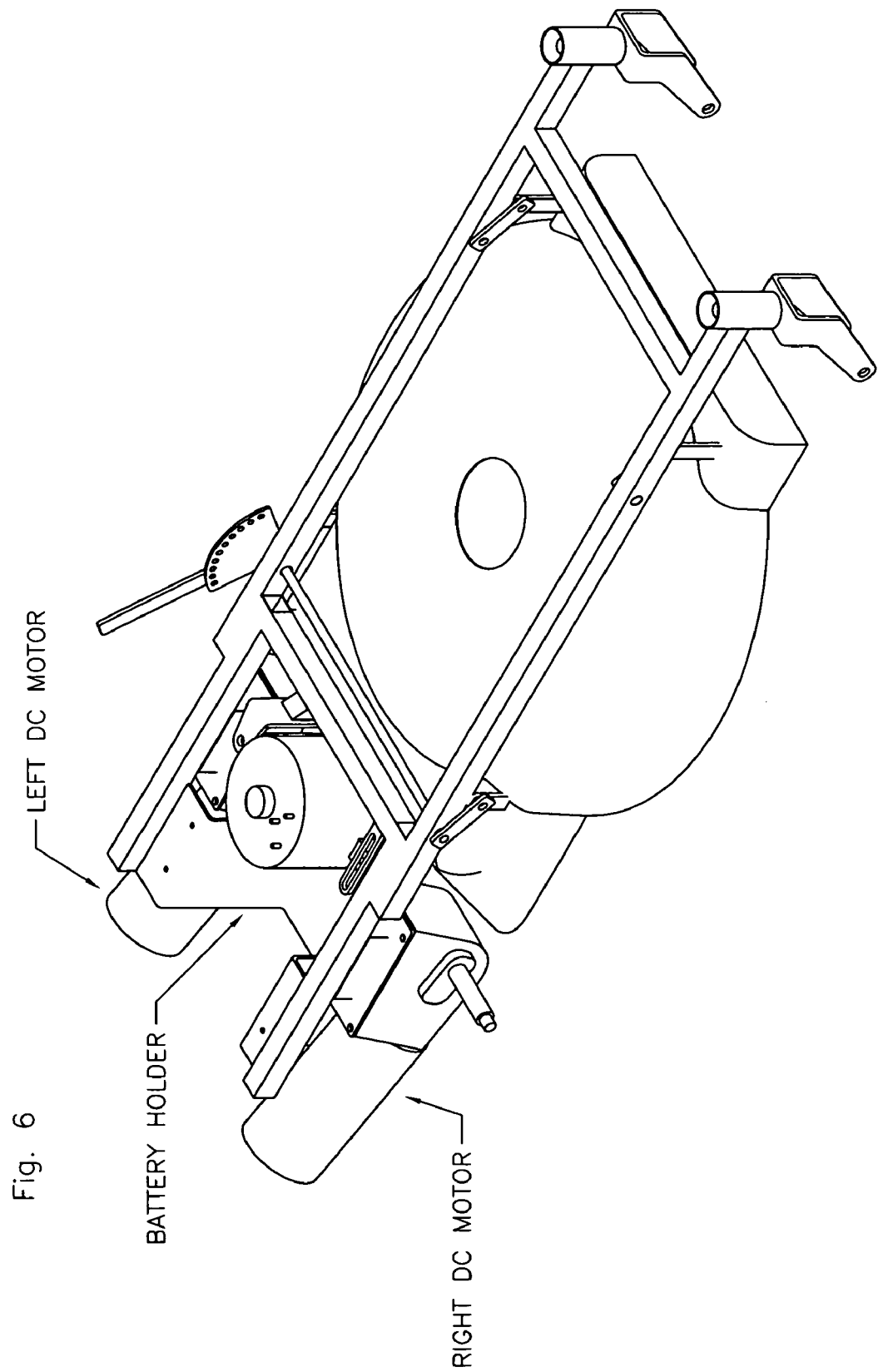
FIG. 6 illustrates the complete frame with the lawn mower deck.

FIG. 6 illustrates the complete frame alternator system.

Figure 7:
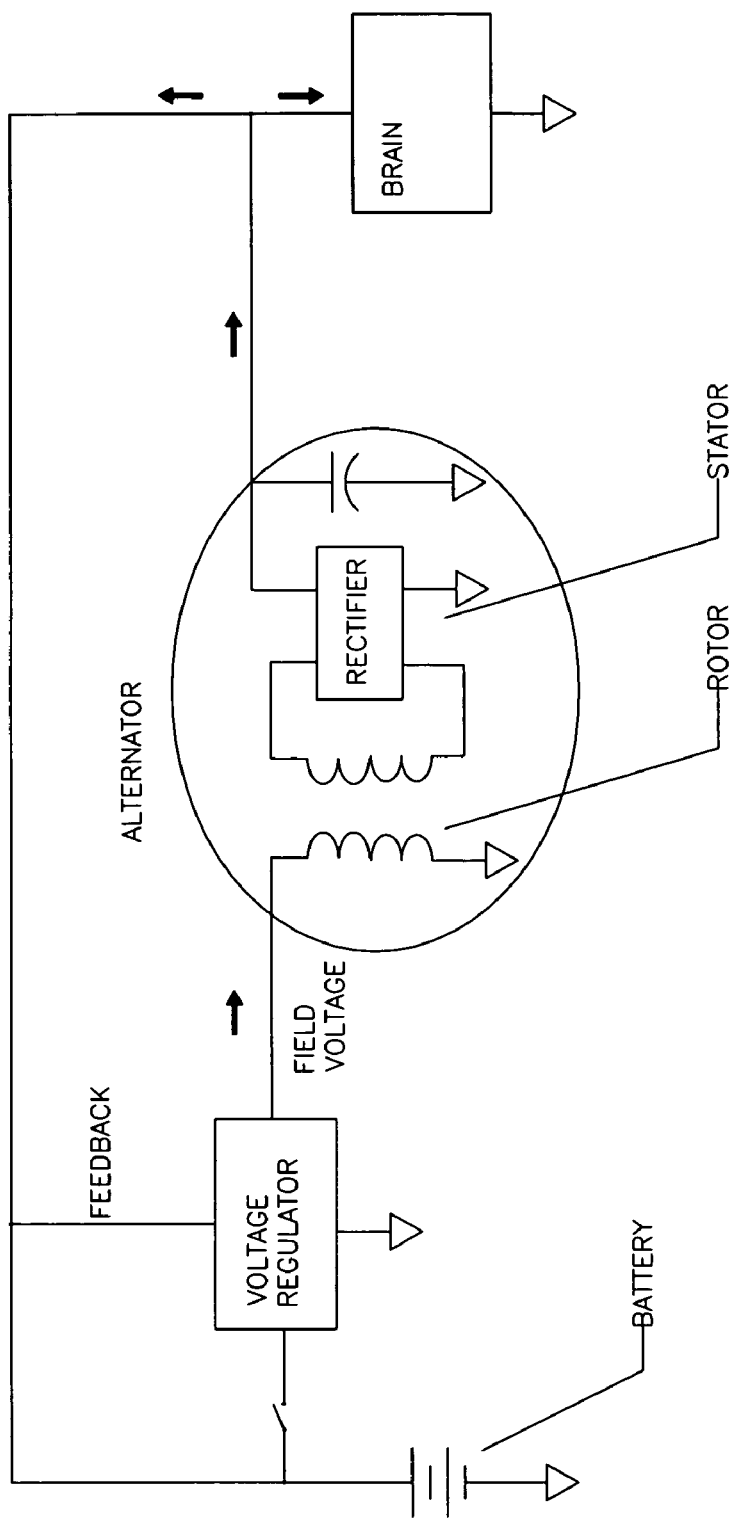
FIG. 7 illustrates the schematics showing the electrical and mechanical components for the hybrid system.

FIG. 7 illustrates the hybrid charging systems comprising of an alternator attached to the lawn mover metal body, a voltage regulator, the gas engine, and a 12-volt battery. The battery supplies the initial field current through the voltage regulator, the gas engine delivers the mechanical energy for the alternator, and the voltage regulator regulates the output voltage of the alternator by controlling the field current to the alternator. This hybrid system generates enough electricity to power the DC motors, electronic components, and charge the battery.

Figure 8:
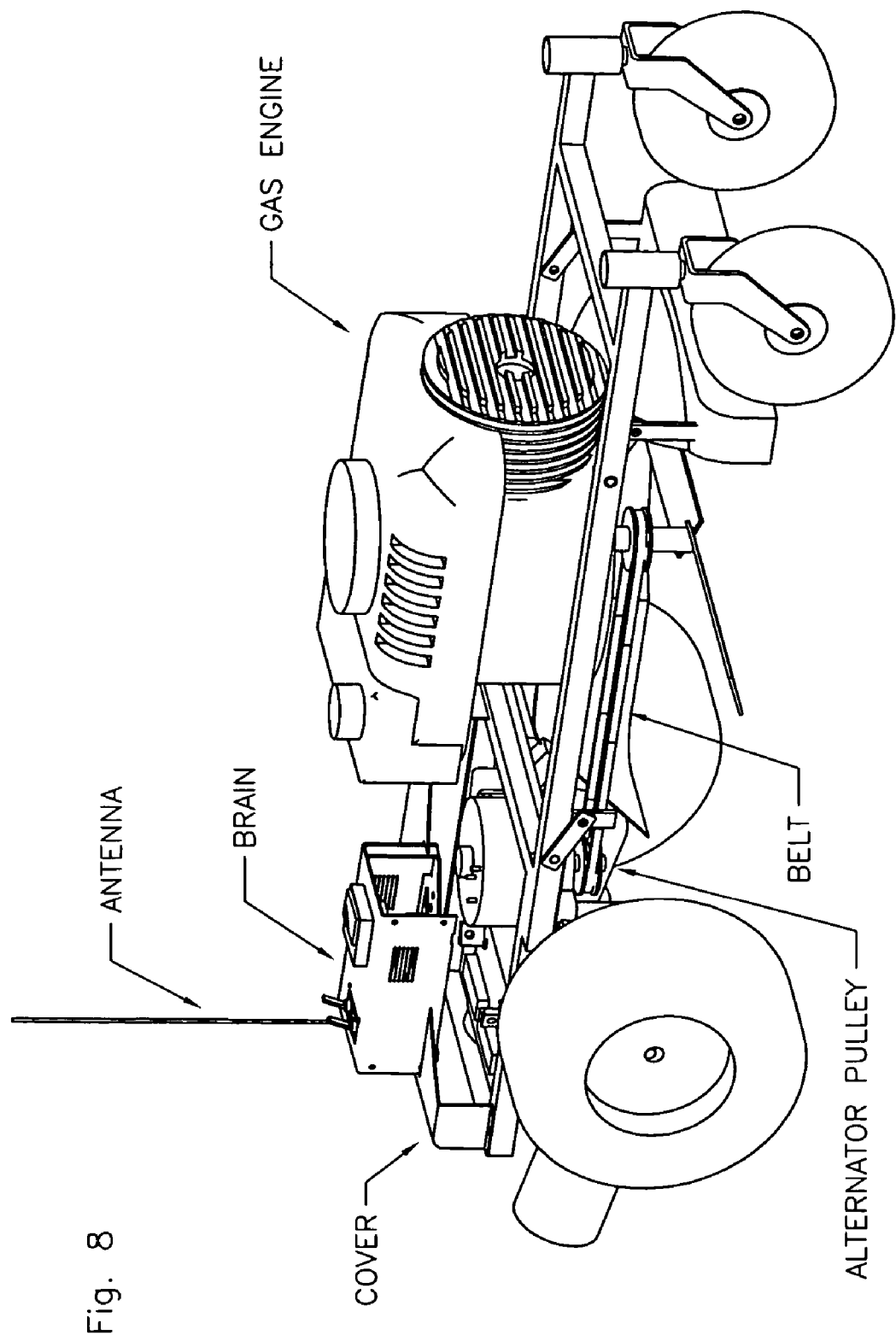
FIG. 8 illustrates the typical design for the alternator, gas engine pulley, belt configuration.

FIG. 8 illustrates a typical design configuration for the pulley, shaft and belt design for the hybrid system.

Figure 9:
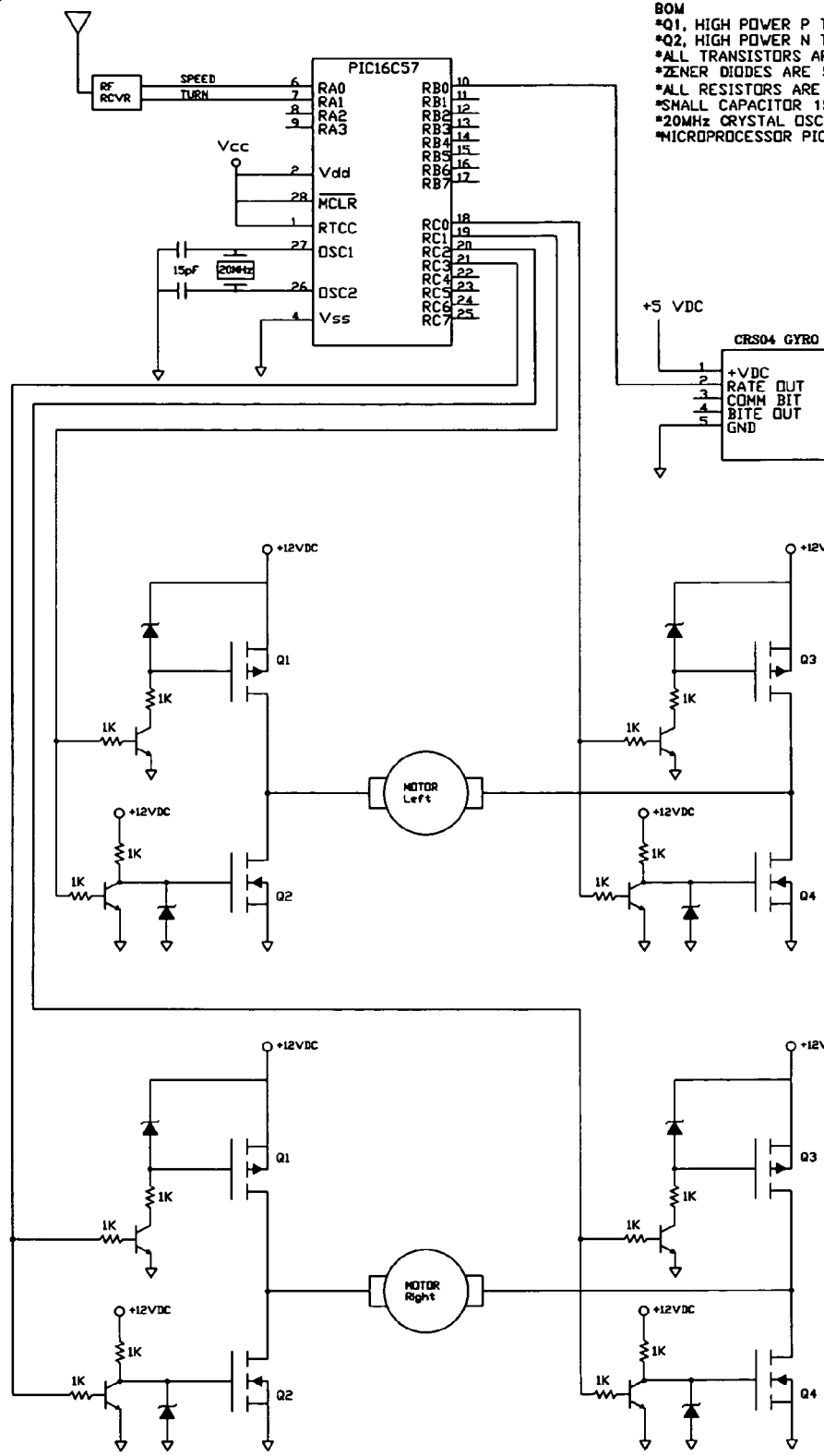
FIG. 9 illustrate the electronic circuit schematics for the brain.

FIG. 9 illustrates the circuit schematics.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What I claim as my invention is:

1. A hybrid remote control lawn mower comprising:
   a frame;
   a right rear DC motor rigidly attached to the frame;
   a right rear wheel rotatably attached to the right rear DC motor for propelling the hybrid remote control lawn mower;
   a left rear DC motor rigidly attached to the frame;
   a left rear wheel rotatably attached to the left rear DC motor for propelling the hybrid remote control lawn mower;
   a right front free swiveling wheel assembly rotatably attached to the frame;
   a left front free swiveling wheel assembly rotatably attached to the frame;
   a lawn mower deck adjustably suspended from the frame wherein the lawn mower deck may be raised and lowered relative to the frame;
   an engine attached to the lawn mower deck;
   a lawn mower blade attached to a rotating shaft of the engine to mow lawn;
   an alternator attached to the lawn mower deck for providing electric power;
   an alternator belt assembly connecting the alternator with the rotating shaft of the engine;
   a battery for storing the electric power;
   a voltage regulator for regulating the output voltage of the alternator;
   a remote control transmitter that sends steering and speed control signals to a receiver; and
   a brain including microprocessors that receive the steering and speed control signals from the receiver and calculates and controls the amount of electric power sent to the right rear DC motor and to the left rear DC motor;
   wherein the hybrid remote control lawn mower turns to the right when the brain sends a greater electric current to the left rear DC motor than to the right rear DC motor; and the hybrid remote control lawn mower turns to the left when the brain send a greater electric current to the right rear DC motor than to the left rear DC motor and wherein the hybrid remote control lawn mower goes straight ahead when the brain sends an equal amount of electric current to the right rear DC motor and the left rear DC motor.

2. The hybrid remote control lawn mower of claim 1, wherein the engine is a gasoline powered engine.

3. The hybrid remote control lawn mower of claim 1 further comprising an electric starter to start the engine, wherein the electric starter is controlled by the remote control transmitter.

4. The hybrid remote control lawn mower of claim 1 further comprising a gyro within the brain to maintain a straight course.

5. The hybrid remote control lawn mower of claim 1 further comprising a lever and elevation plate assembly to provide predetermined fixed height adjustments between the frame and the suspended lawn mower deck.

6. The hybrid remote control lawn mower of claim 1 further including a zero turning radius.

7. The hybrid remote control lawn mower of claim 1 further including a belt tensioning mechanism to maintain an alternator belt tension between the alternator and the rotating shaft of the gasoline engine.

* * * * *